United States Patent [19]

Birk et al.

[11] Patent Number: 5,381,775
[45] Date of Patent: Jan. 17, 1995

[54] SYSTEM FOR CONTROLLING AN INTERNAL COMBUSTION ENGINE

[75] Inventors: Manfred Birk, Oberriexingen; Gerhard Engel, Stuttgart; Peter Rupp, Remseck; Wolf Wessel, deceased, late of Oberriexingen, all of Germany, by Christa Wessel, Wilfried Wessel Heirs

[73] Assignee: Robert Bosch GmbH, Stuttgart, Germany

[21] Appl. No.: 29,215

[22] Filed: Mar. 10, 1993

[30] Foreign Application Priority Data

Mar. 10, 1992 [DE] Germany .............. 4207541

[51] Int. Cl.6 .................................... F02B 75/08
[52] U.S. Cl. .................................... 123/679; 123/676
[58] Field of Search .................... 123/676, 679

[56] References Cited

U.S. PATENT DOCUMENTS

| | | | |
|---|---|---|---|
| 5,099,818 | 3/1992 | Takahashi et al. | 123/679 |
| 5,129,379 | 7/1992 | Kaneyasu et al. | 123/679 |
| 5,158,063 | 10/1992 | Hosoda et al. | 123/676 |

FOREIGN PATENT DOCUMENTS

3405495A1 8/1985 Germany .

OTHER PUBLICATIONS

E. Pauli et al., "Exhaust Emission Control-System for the Comprex ® Diesel Engine", *Motortechnische Zeitschrift*, vol. 50, No. 6, Jun. 1989, pp. 263–267.

*Primary Examiner*—Raymond A. Nelli
*Attorney, Agent, or Firm*—Kenyon & Kenyon

[57] ABSTRACT

The invention relates to a system for controlling an internal combustion engine, in particular a self-igniting internal combustion engine. First means (200) specify a first signal (MLS, US) on the basis of at least one operating parameter (QK, N). Second means (235) specify a second signal (MLI) on the basis of at least the output signal from a lambda probe (125). A third means (220) calculates a third signal on the basis of the first signal and the second signal and applies it to a final controlling element (230). Furthermore, means (515, 520, 530, 610, 235) are provided for the temporal conditioning of the first and second signal.

30 Claims, 14 Drawing Sheets

SYSTEM FOR CONTROLLING AN INTERNAL COMBUSTION ENGINE

FIELD OF THE INVENTION

The present invention relates to system for controlling the operation of an internal combustion engine.

BACKGROUND OF THE INVENTION

German Published Patent Application 34 05 495 describes a device for controlling an internal combustion engine, in which the charge-air pressure is not detected by a sensor, but rather is calculated through a sensor-independent simulation. The simulation specifies the charge-air pressure based upon the rotational frequency and the fuel quantity to be injected.

The periodical article MTZ 50 (1989) 6, p. 263 ff. describes a system for adjusting the exhaust-gas recirculation rate of a pressure-charged diesel engine. The described device provides a lambda probe whose output signal is fed to an automatic control electronic system. The automatic control electronic system then triggers the servomotor of a throttle valve, which influences the exhaust-gas recirculation rate. This signal for triggering the final controlling element depends upon the difference between a lambda setpoint value and a lambda actual value. To compensate for the dead time that occurs in this closed-loop control circuit, a control structure is provided which is very expensive and susceptible to faults.

An object of the present invention is to create the most precise and inexpensive possible controlling system for controlling an internal combustion engine. This objective is solved by the features of the present invention.

SUMMARY OF THE INVENTION

In comparison to prior art, the system according to the present invention creates a more precise open-loop control system for an internal combustion engine which results in very low exhaust-gas emission.

DETAILED DESCRIPTION OF THE DRAWINGS

Figure 1:
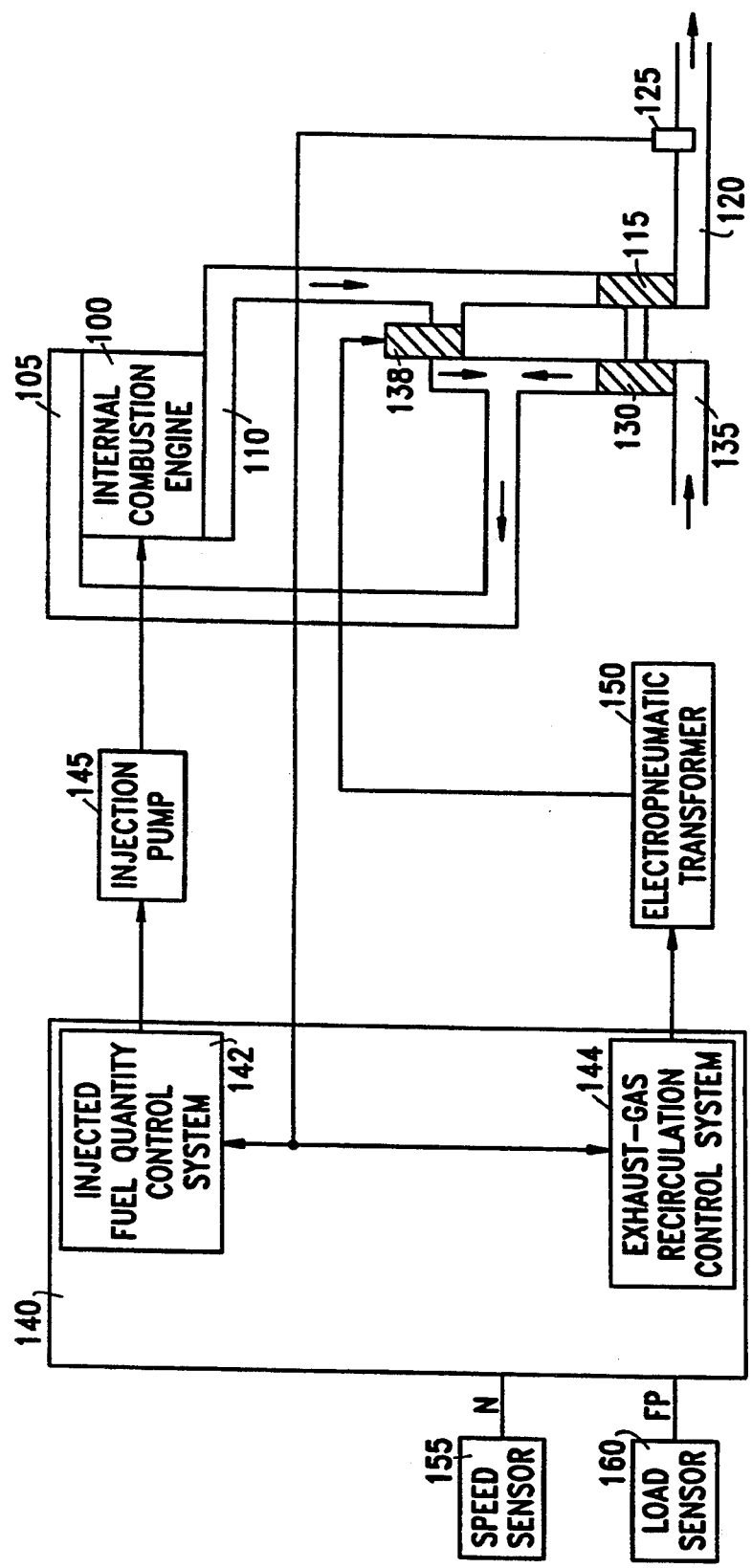
FIG. 1 illustrates a system for controlling a pressure-charged internal combustion engine having exhaust-gas recirculation.

FIG. 1 illustrates a system for adjusting the exhaust-gas recirculation rate for an internal combustion engine. The exhaust-gas performance characteristics are considerably improved by the present invention. However, the present invention can also be used for other types of internal combustion engines.

Fresh air is supplied through a fresh-air pipe 105 to an internal combustion engine 100. The exhaust gas is discharged through an exhaust pipe 110. The exhaust gas connects to another exhaust pipe 120 by way of a turbine 115. A lambda probe 125 is arranged in the exhaust pipe 120.

The turbine 115 actuates a supercharger 130, which supplies the air flowing through an intake line 135 to the fresh-air pipe 105. The exhaust pipe 110 and the fresh-air pipe 105 are connected by way of an exhaust-gas recirculation valve 138.

In addition, an electronic control unit 140 is provided which comprises a system for controlling injected fuel quantity 142 and a system for controlling exhaust-gas recirculation 144. The system for controlling the fuel injection quantity 142 sends signals to an injection pump 145, which meters a defined fuel quantity to the internal combustion engine based upon these signals. The system for controlling exhaust-gas recirculation 144 communicates with an electropneumatic transformer 150. This electropneumatic transformer 150 actuates the exhaust-gas recirculation valve 138.

The lambda probe 125 supplies a signal to the system for controlling injected fuel injection quantity, as well as exhaust-gas recirculation 144. In addition, the electronic control unit 140 communicates with various sensors 155 and 160.

This device, as described above, functions as follows. The supercharger 130 compresses the air flowing in through the intake line 135. This air then connects to the internal combustion engine 100 by way of the fresh-air pipe 105. The exhaust gas leaving the internal combustion engine 100 reaches the turbine 115 via the exhaust pipe 110 and then reaches the exhaust pipe 120. The turbine 115, thereby actuates the supercharger 130.

The composition of the air supplied to the internal combustion engine can be influenced by the exhaust-gas recirculation valve 138. To this end, the system for controlling exhaust-gas recirculation transmits a signal having an appropriate pulse duty factor to the electropneumatic transformer 150. In the case of a high pulse duty factor, the exhaust-gas recirculation valve 138 opens, and a high exhaust-gas recirculation rate results. Correspondingly, a low pulse duty factor results in a low exhaust-gas recirculation rate.

In the case of a closed exhaust-gas recirculation valve 138, no exhaust gas arrives in the fresh-air pipe. However, a considerable portion of exhaust gas arrives in the fresh-air pipe 105 when the exhaust-gas recirculation valve 138 is completely open. Such a device is essentially known from prior art.

The injection pump 145 supplies the fuel quantity required for combustion to the internal combustion engine 100. An electropneumatic transformer 150 actuates the exhaust-gas recirculation valve based upon the pulse duty factor of its trigger signal. The electronic control unit 140 specifies the trigger signals for the injection pump 145 and the pulse duty factor for the electromagnetic transformer 150. For this purpose, the electronic control unit 140 evaluates various signals including a speed signal from the speed sensor 155, and a load signal, which is detected by a sensor 160 as the gas pedal position. Furthermore, the output signal from the lambda probe 125 connects to both the system for controlling injected fuel quantity 142 and the system for controlling exhaust-gas recirculation 144.

The lambda probe 125 is preferably designed to supply an output signal that is proportional to the oxygen concentration in the exhaust gas.

Figure 2:
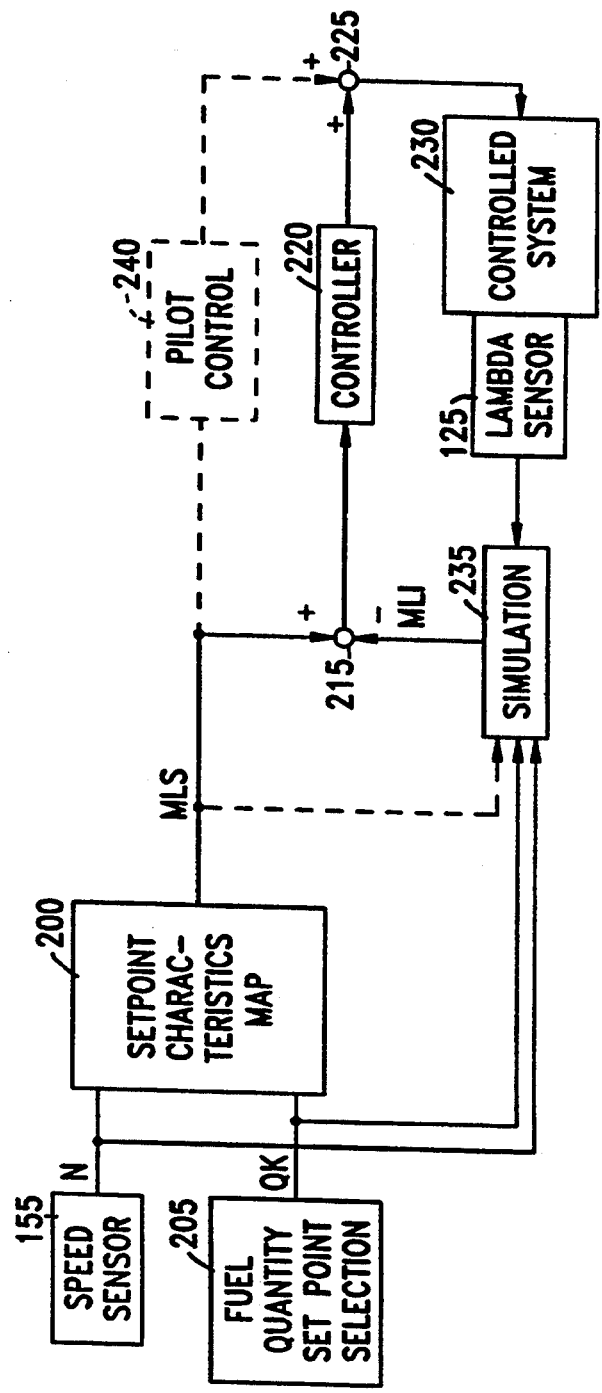
FIG. 2 shows a specific embodiment of the present invention.

FIG. 2 depicts a specific embodiment of the present invention. Corresponding blocks which have already been described in FIG. 1, are denoted by the same reference numerals in FIG. 2 and other Figures. A setpoint characteristics map 200 communicates with at least one speed sensor 155 and one fuel-quantity setpoint selection 205. The setpoint engine characteristics map 200 transmits a variable MLS via a summing point 215 to a controller 220. As shown by dotted lines, this signal can also be fed to a simulation 235, or rather to a pilot control 240.

The controller 220 communicates via a summing point 225 with the controlled system 230. The output signal from the pilot control 240 can be injected at the summing point 225. The lambda sensor 125 detects the oxygen concentration in the exhaust gas of the internal combustion engine contained in the controlled system. This signal connects to the simulation 235 as an input variable. The summing point 215 receives a second signal from the simulation 235. Furthermore, the simulation 235 communicates with the speed sensor 155 and the fuel-quantity setpoint selection 205. As indicated by a dotted line, the simulation can also communicate with the setpoint characteristics map 200.

This device, as described above, functions as follows. A setpoint value, for example, for the air quantity MLS, is filed in the setpoint characteristics map 200 based upon the rotational frequency N and the selected fuel injection quantity QK. The selected fuel injection quantity QK to be injected is specified by the fuel-quantity setpoint selection 205 based on many possible variables including the gas pedal position or the output signal from a driving speed closed-loop control.

The setpoint value relating to the intake-air quantity MLS is compared in the summing point 215 to an actual value for the intake-air quantity MLI. Based upon this comparison, the controller 220 supplies a manipulated variable via the summing point 225 to the controlled system 230.

The controlled system 230 is preferably comprised of an internal combustion engine, a fuel pump, which determines the power output of the internal combustion engine, and a device for recirculating exhaust gas into the intake air. The fuel pump and the device for recirculating exhaust gas are final controlling elements, which establish the injected fuel quantity and the exhaust-gas recirculation rate, respectively. A specific exhaust-gas recirculation rate ensues based on the output signal from the controller 220. The oxygen concentration in the exhaust gas of the internal combustion engine is then detected by the lambda sensor 125.

Based on the rotational frequency N and the selected fuel injection quantity QK, the simulation 235 defines the actual value MLI for the controller 220. In determining the actual air quantity MLI, the simulation 235 considers the output signal from the lambda probe 125. The simulation merely employs those signals, which are customarily used in the open-loop control systems. Therefore, additional sensors are not needed. Sensors for detecting the intake-air quantity are dispensable.

Furthermore, a pilot control 240 can be provided, which formulates a controlled variable based on the setpoint value MLS filed in the setpoint characteristics map 200. This controlled variable is transmitted, via the node 225, to the controlled system 230. In some instances, the setpoint value MLS is likewise supplied to the simulation 235.

In place of the air quantity, the oxygen concentration of the exhaust gas $\lambda$ can also be filed in the setpoint characteristics map 200. In this case, the simulation 235 calculates a simulated lambda value.

Figure 3:
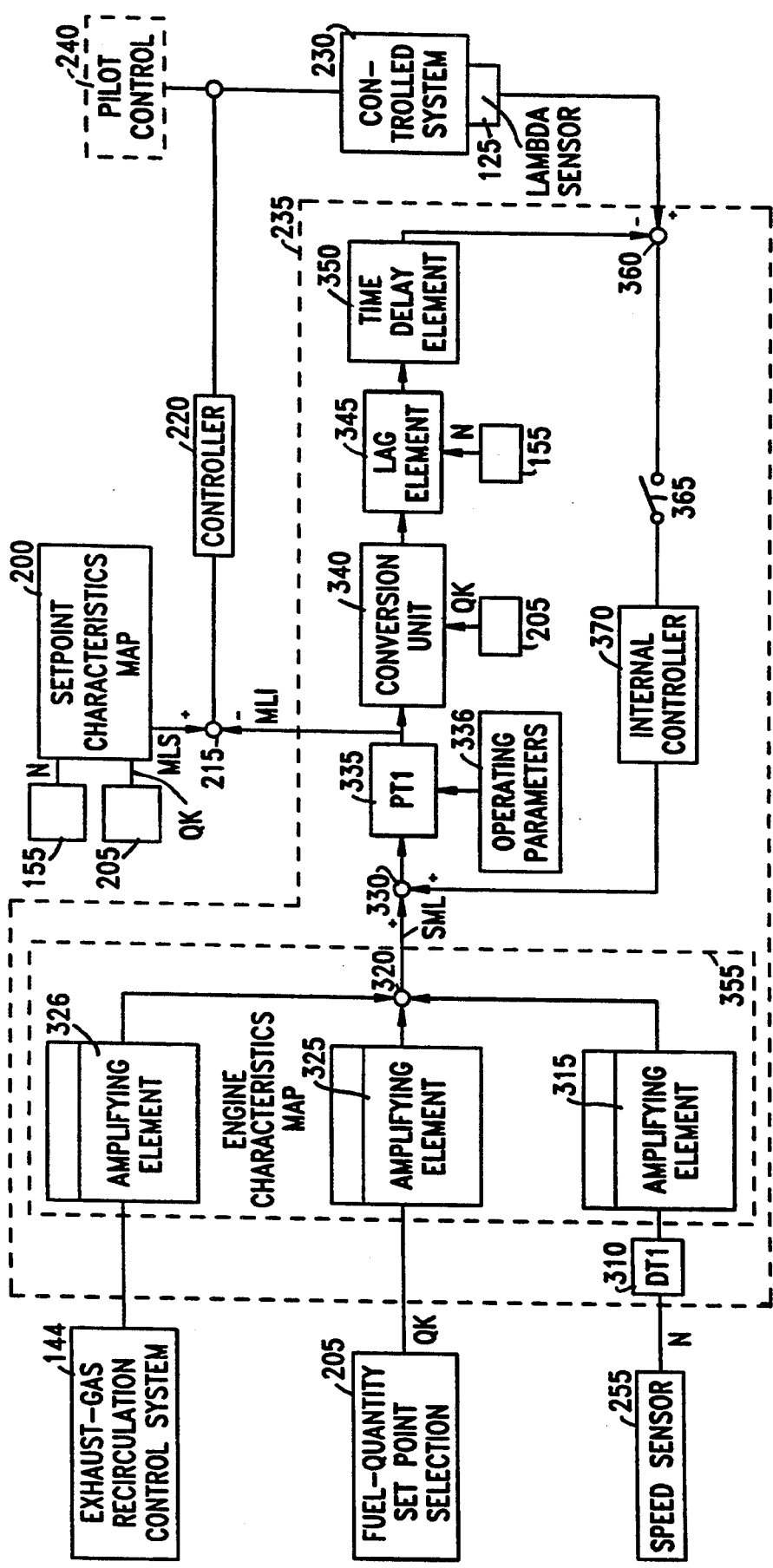
FIG. 3 shows a detailed depiction of a simulation that is part of the system of the present invention.

FIG. 3 shows a detailed depiction of the simulation 235. To simplify the Figure, the sensor 155 and the fuel-quantity setpoint selection 205 are drawn several times.

The output signal from the fuel-quantity setpoint selection 205 connects to a node 320 via a first amplifying element 325. The output signal from the speed sensor 155 likewise connects to the node 320 via a DT1 element 310 and a second amplifying element 315. A particularly advantageous feature is that the output signal from the system for controlling exhaust-gas recirculation 144, or a corresponding signal, can connect to the node 320 via an amplifying element 326. The blocks 325, 315, 326, as well as the node 320 comprise the engine characteristics map 355.

A simulated air-quantity signal SML is applied to the output of the engine characteristics map 355 at the node 330. This signal connects to the summing point 215 via the summing point 330 and a PT1 element 335. Furthermore, the output signal from the PT1 element 335 connects to the reference point 360 via a conversion unit 340, a lag element 345 and a time-delay element 350. In addition, the output signal from the fuel-quantity setpoint selection 205 is supplied to the conversion unit 340. Likewise, the rotational frequency N is transmitted to the lag element 345.

This signal is compared in a reference point 360 to the air ratio a.k.a. excess-air factor $\lambda$ derived from the lambda probe 125. The output signal from the reference point 360 connects to an integral controller 370 via a circuit component 365. The second input of the summing point 330 is the output signal from the integral controller 370.

The signal MLI applied to the output of the supercharger simulation is converted in blocks 340, 345, 350 into the air ratio $\lambda$. After the comparison is made with the air ratio measured by the lambda probe 125, the supercharger model is trimmed by the integral controller 370 based on the deviation between the measured and calculated air ratio.

If the simulation is used to make available an air-quantity signal for a pilot control of the full-load closed-loop control system, a.k.a. a smoke limitation, then it is possible for this trimming to only take place during certain operating states. For this purpose, the circuit component 365 transmits the output signal from the reference point to the integral controller 370, only when such excellent operating states exist. In this case, an excellent operating state is the steady-state full load.

If the system is used to control the exhaust-gas recirculation rate, then the trimming is usually carried out in all operating states. If the exhaust-gas recirculation rate is considered in the engine characteristics map 355 by the amplifier 326, then the trimming only takes place in certain operating states. If the exhaust-gas recirculation rate is not considered, the circuit component 365 must remain continually closed.

In place of the described cumulative correction, more costly refinements are also possible. For example, a multiplicative correction or a combination of a multiplicative and a cumulative correction can be provided. The engine characteristics map 355 can also be directly corrected. It is also possible, thereby for different corrections to be made at different working points.

Blocks 310 through 326 constitute the supercharger simulation, which makes available a simulated air quantity SML. After this signal is filtered in the PT1 element 335, a signal MLI pertaining to the quantity of air actually consumed is available at its output. It is particularly advantageous when the time constant of the PT1 element 335 is adjustable based on various operating parameters 336, i.e., the time constant on the rotational frequency N, the selected fuel injection quantity QK or a signal, which characterizes the exhaust-gas recirculation rate.

Based on input variables, i.e., the selected fuel injection quantity QK and the rotational frequency N, the simulation, also described as a model, calculates the quantity of actual air consumption MLI. The accuracy of the calculation is increased because a measure of the air quantity that is actually needed is acquired. Such a signal is, for example, the output signal from the lambda probe 125.

In the case of internal combustion engines having a system for controlling exhaust-gas recirculation, a particularly advantageous feature is the use of a signal during the simulation, which characterizes the exhaust-gas recirculation rate. One such signal is the pulse duty factor, which triggers the electropneumatic transformer 150. Alternatively, a signal can also be used, which specifies the position of the exhaust-gas recirculation valve, or rather the measured exhaust-gas recirculation rate.

In this exemplified embodiment, the air ratio is calculated in the conversion unit 340 based on the air-quantity signal MLI and the selected fuel injection quantity QK. This signal must be adapted with the exhaust-gas delay time and the dynamic probe response of the lambda probe 125. For this purpose, a lag element 345 is provided, which considers the exhaust-gas delay time. The exhaust-gas delay time depends heavily on the rotational frequency of the internal combustion engine. Therefore, the dead time is specified based on rotational frequency. Other operating parameters can be considered quite advantageously. The time-delay element 350 considers the probe dynamic response. A lambda signal, which corresponds to the simulated air quantity ML, is ready at the output of the time-delay element 350. In its time response, this signal also corresponds to the output signal expected from the lambda probe 125.

If the model, blocks 340, 345, and 355, do not correctly reproduce the performance characteristics of the controlled system 230 of the internal combustion engine, then there is a difference between the signal detected by the lambda probe 125 and the calculated variable. This difference is fed to the integral controller 370. The integral controller generates an injection signal which is received by the summing point 330 in such a way, that the deviation between the calculated and the measured variable becomes zero.

Figure 4:
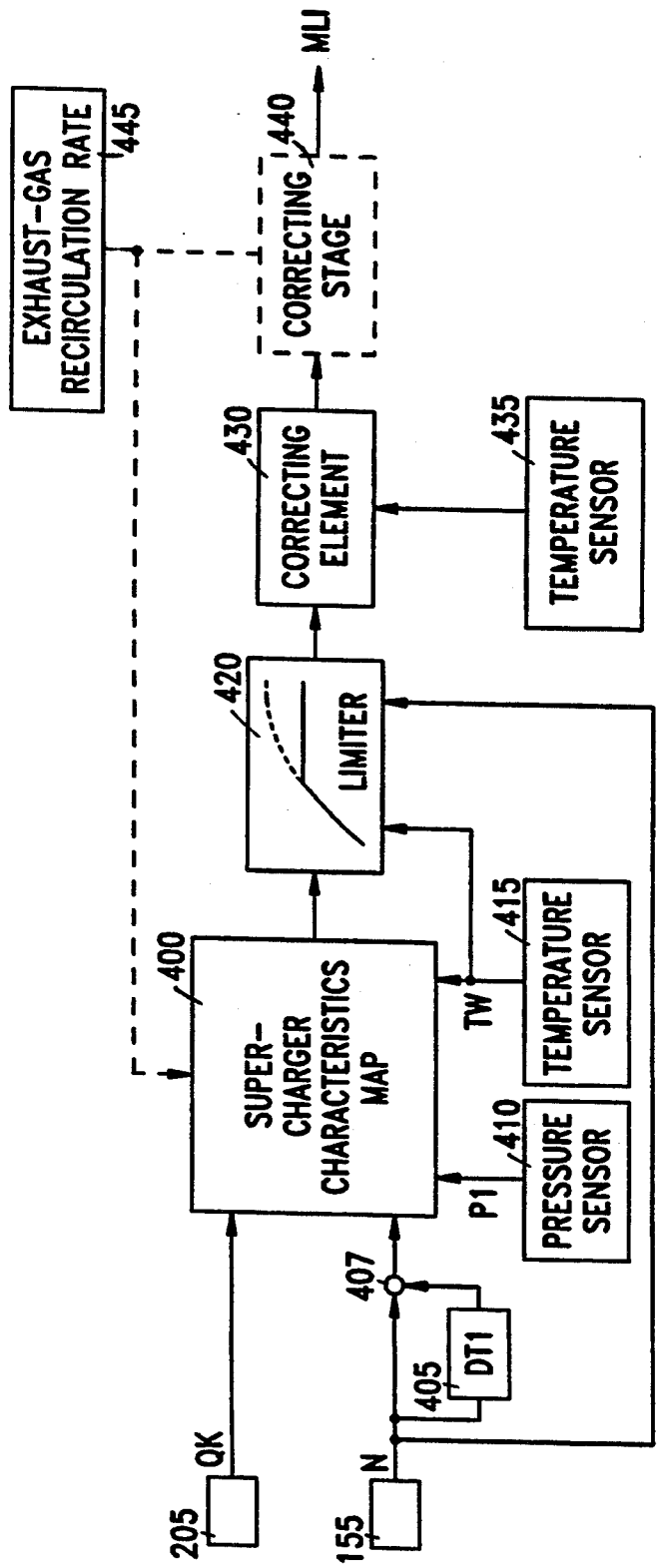
FIG. 4 illustrates a refinement of the simulation that is part of the system of the present invention.

A further simulation 235 for calculating the intake-air quantity is shown in FIG. 4. This simulation represents a simplification of the simulation shown in FIG. 3. The output signal from the fuel-quantity setpoint selection 205 directly connects to a supercharger characteristics map 400. The speed signal N connects to a summing point 407 either via a DT1 element 405 or directly. From this summing point 407, it then connects to the supercharger characteristics map 400. In addition, signals from a pressure sensor 410 and a temperature sensor 415 are transmitted to the supercharger characteristics map 400.

In a system having exhaust-gas recirculation, a signal pertaining to the exhaust-gas recirculation rate can also be supplied to the supercharger characteristics map 400. The pulse duty factor, which triggers the electropneumatic transformer 150 is particularly suited for such a system. Alternatively, a signal can also be used, which specifies the position of the exhaust-gas recirculation valve, a.k.a. the exhaust-gas recirculation rate.

The output signal from the supercharger characteristics map 400 connects to a time-delay element having a limiter 420, which is also described as a PT1 element having a limitation. Furthermore, the output signal from the temperature sensor 415, as well as the speed signal N are transmitted to this PT1 element 420. The output signal from the PT1 element 420 then connects to the correcting element 430, which, in addition, communicates with a temperature sensor 435.

Values pertaining to the intake-air quantity, or rather to the charge-air pressure P2 are filed in the supercharger characteristics map 400 based on the selected fuel injection quantity QK and the rotational frequency N. In cases of sudden acceleration or deceleration, an increased or decreased air quantity can be requested by the DT1 element 405.

It is also advantageous for the output signal to be based on the cooling-water temperature TW and the atmospheric pressure P1, which is acquired by the sensor 410. The cooling-water temperature TW is acquired by the temperature sensor 415.

The output of the supercharger characteristics map 400 signal is filtered through a limiter element 420 of the PT1 element and is limited to a highest permissible value. The filter constants and the highest permissible value depend on the temperature, particularly on the cooling-water temperature TW and/or on the rotational frequency N.

It is also advantageous to provide a further correction 430, which allows for the influence of the ambient air temperature T1. The output signal from the second temperature sensor 435 is used for this purpose. Thus, a signal pertaining to the intake-air quantity, or rather to the charge-air pressure is applied to the output of the correcting element 430.

To calculate this variable, the simplest refinement requires a signal QK which pertains to the selected fuel injection quantity and the rotational frequency N. The accuracy of this signal can be further increased by employing additional sensors to supply the atmospheric pressure P1, cooling-water temperature TW, and ambient temperature T1.

This simulation is preferably employed when no exhaust-gas recirculation is provided. In systems having exhaust-gas recirculation, a further correction step 440 is required, which considers a signal 445 pertaining to the exhaust-gas recirculation rate. The pulse duty factor, which triggers the electropneumatic transformer 150, is such a signal. Alternatively, a signal can also be used that specifies the position of the exhaust-gas recirculation valve a.k.a, the exhaust-gas recirculation rate. The output signal MLI from this simulation is fed to the node 215.

Another specific embodiment of the system according to the present invention is shown in FIG. 5. This specific embodiment refers to a closed-loop control system for controlling the exhaust-gas recirculation rate of a diesel gasoline engine.

Figure 5A:
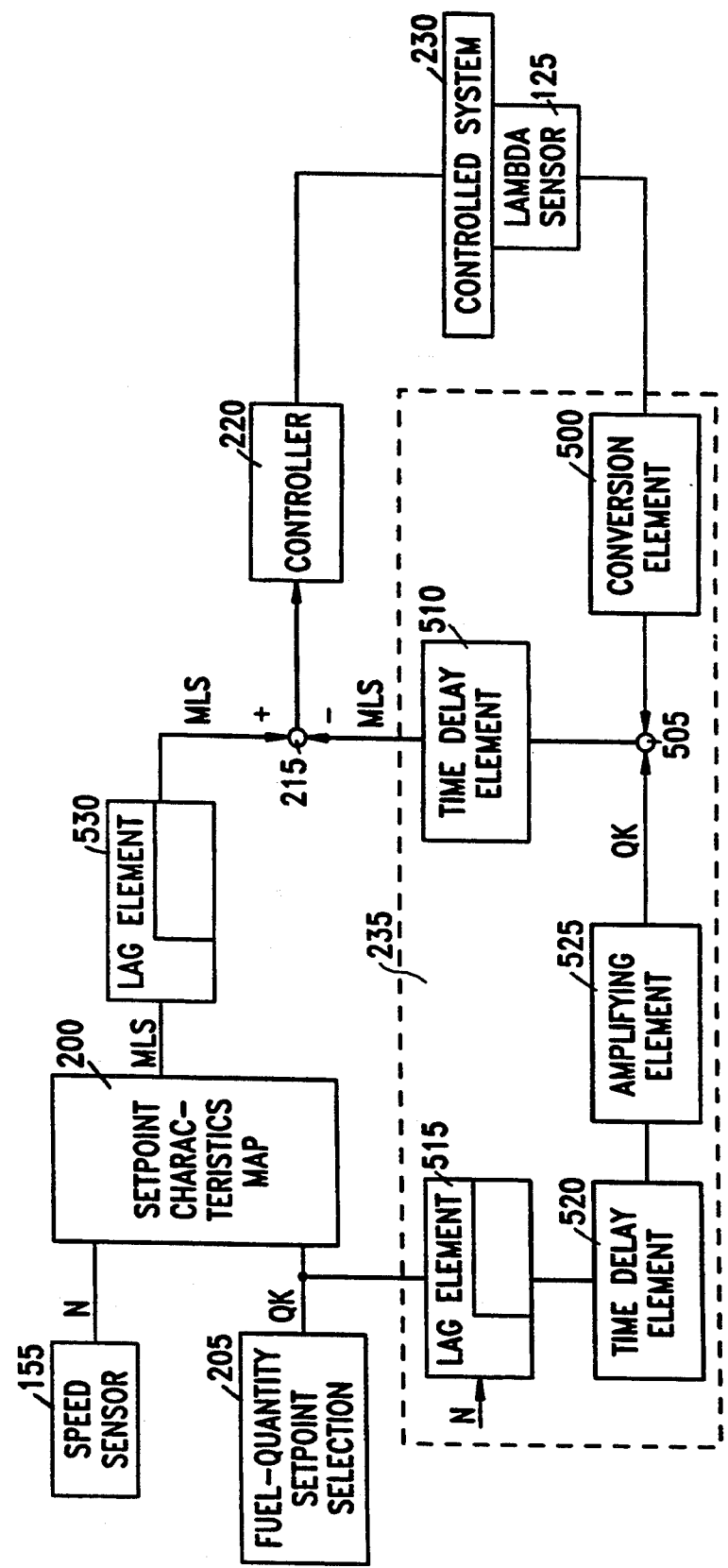
FIGS. 5a–5d show the structure of a specific embodiment of the present invention, in which the air quantity is regulated.

In the refinement according to FIG. 5a, the setpoint engine characteristics map 200 communicates with the speed sensor 155 and the fuel-quantity setpoint selection 205. The fuel-quantity setpoint selection generates a signal QK, which specifies the fuel quantity to be transmitted to the internal combustion engine. The setpoint characteristics map transmits a signal MLS pertaining to the air quantity required for combustion via a lag element 530 to the summing point 215. The output variable of the summing point 215 connects to the controller 220.

The output signal from the controller 220 connects to the controlled system 230. The controlled system 230 comprises the electropneumatic transformer 150, the exhaust-gas recirculation valve 138, and the internal combustion engine 100.

The lambda probe 125 delivers a signal to a conversion element 500. The output signal from the conversion element 500 connects to a node 505. The output signal from the node 505 connects to, via a time-delay element 510, the second input of the summing point 215. The signal from the fuel-quantity setpoint selection 205 pertaining to the selected fuel injection quantity connects to the second input of the node 505 via a lag element 515, a time-delay element 520, and an amplifying element 525.

This device, as described above, functions as follows. Based on the gas-pedal position and other operating parameters, the fuel-quantity setpoint selection 205 emits a signal QK, which corresponds to the fuel quantity to be injected. Based on this signal and rotational frequency, the air quantity MLS required for combustion is filed in the setpoint characteristics map 200.

The lambda probe 125 produces a signal, which corresponds to the oxygen concentration in the exhaust gas of the internal combustion engine. Preferably, the output signal from the lambda probe is proportional to the oxygen concentration in the exhaust gas. A characteristic probe curve, which indicates the correlation between the oxygen concentration in the exhaust gas and the air ratio λ is filed in the conversion element 500.

Based on the output signal from the lambda probe 125, the conversion element 500 determines the air ratio λ. Based on the air ratio λ and the selected fuel injection quantity QK, the node 505 calculates the actual quantity of air MLI consumption. The quantity of air MLI actually consumed in combustion follows from the expression:

$$MLI = 14.5 * \lambda * QK$$

Based on the comparison between the required air quantity MLS and the consumed air quantity MLI, the controller 220 produces a pulse duty factor for triggering 230 the electropneumatic transformer 150. This signal is produced in a way that will allow the deviation between the required air quantity and the actual quantity of air consumption to become zero. Preferably, a controller 220 is used which exhibits, at the least, a PI control response.

Because of the exhaust-gas delay times and the delay in the probe signal, the different variables lack the proper synchronization. Thus, a speed-dependent exhaust gas delay time of approximately 200 ms results. The lambda probe likewise shows a dead time of approximately 25 ms and a delay time of approximately 100 ms. This means that in case of a sudden load change, such as a change in the injected fuel quantity QK, this only has an effect after the dead time has expired. The values are adjusted to the new operating parameters after the end of the delay time.

In the case of dynamic processes, a system dependent deviation results between the setpoint value and the actual value during the dead time and the delay time. This deviation results in a corresponding manipulated variable. The variable is applied to the controlled system 230, which produces a very poor control response (overshoot).

To avoid these disadvantages, the quantity signal QK is delayed accordingly. This means that the quantity signal QK is adapted to the dynamic response of the controlled system, a.k.a. the lambda probe 125. For this purpose, there is provided a speed-dependent lag element 515 and/or a time-delay element 520. With these elements 515 and 520, the fuel quantity QK required to calculate the actual value is delayed comparably to the lambda signal. In addition or alternatively, the output signal MLS from the setpoint characteristics map 200 can be delayed by using a further lag element 530.

Further, the fuel quantity QK, which is supplied to the setpoint characteristics map 200, can also be delayed accordingly by using lag elements and/or time-delay elements.

In a coasting overrun operation, i.e., when the air mass is calculated to be zero, the injected fuel quantity assumes the value zero. Also, during switching operations, steep peaks in the calculated quantity of air arise, which do not occur in the actual intake air. These are limited and damped by the time-delay element 510, which is preferably designed as a PT1 filter. The time-delay element 510 acts as a filter, which eliminates short pulse overshoots attributed to mismatches of the simulated dead time. A rate-of-change limitation can also be used in place of a PT1 filter. Such a rate-of-change limitation likewise eliminates short pulse overshoots.

Such a system results in a satisfactory operational performance. However, the dynamic response of the exhaust-gas recirculation control during a load change is relatively poor because of the exhaust-gas delay times. In case of an acceleration, the delay is caused by the additional time in calculating the air quantity which results in a slow controller. These disadvantages, occurring during acceleration operations or other dynamic driving conditions, can be avoided by the specific embodiments described in the following exemplified embodiments.

A pilot control is provided to compensate for these disadvantages occurring in dynamic driving operations. A system having pilot control is depicted, for example, in FIG. 5b.

In addition to the modules existing in FIG. 5a, the signal QK, which pertains to the selected fuel injection quantity, can be fed to the node 545 via a DT1 element 535 and an asymmetrical amplifier 540. The node 545 combines the output signal from the asymmetrical amplifier with the output signal from the controller 220.

The output signal from the node 545 is then transmitted to the controlled system 230.

Figure 5B:
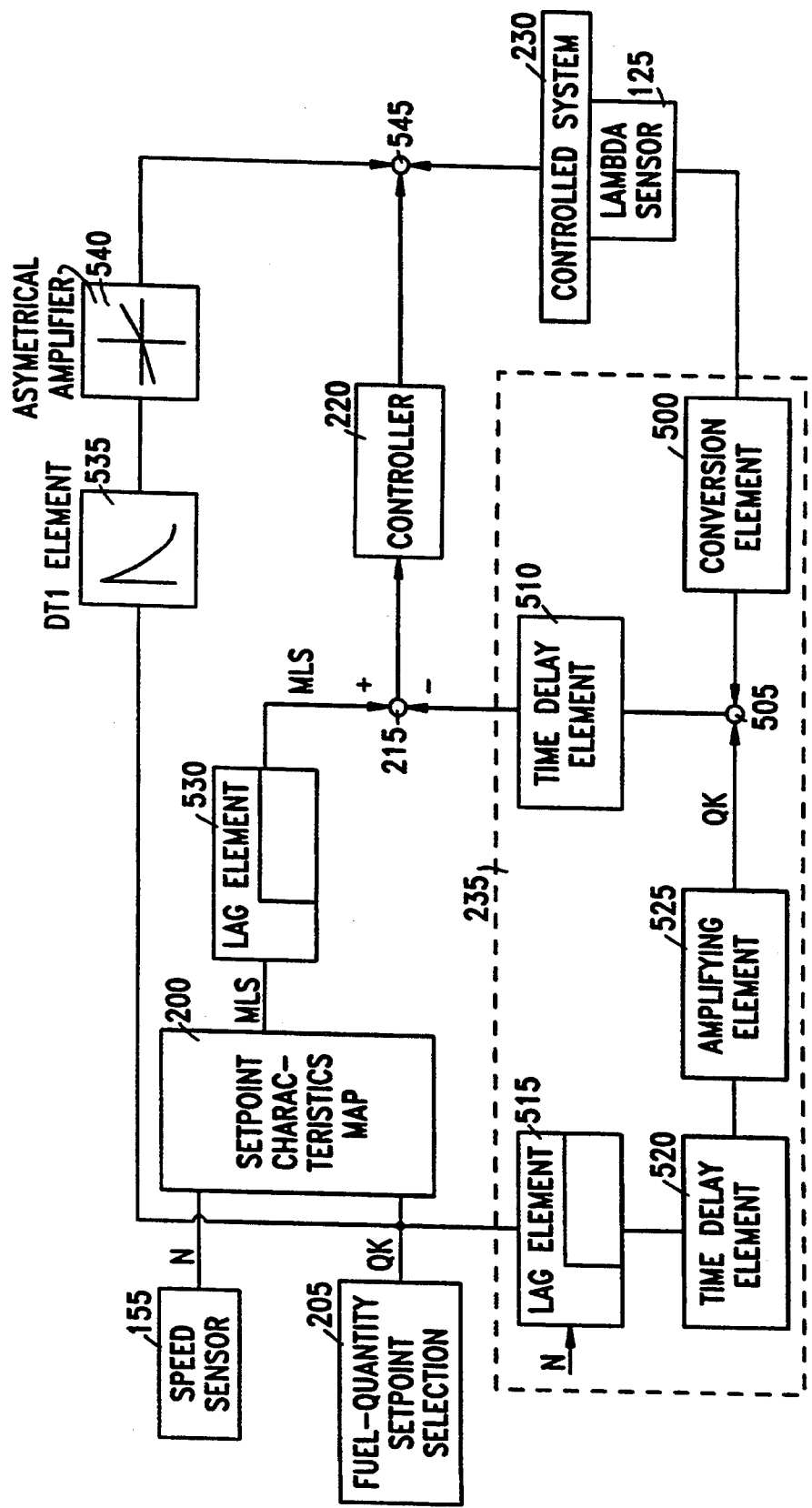

This system as illustrated in FIG. 5b functions in the following way. In case of a sudden change in the fuel quantity QK, the DT1 element 535 generates a corresponding output signal. This signal is amplified accordingly in the amplifier 540 having an asymmetrical gain characteristic. This gain characteristic is preferably rated so that the amplification selected in the case of negative signals is smaller than in the case of positive signals.

In case of a sudden change in the load, i.e., given higher fuel quantities, the DT1 element causes the final controlling element of the controlled system 230 to receive a pulse duty factor which results in the immediate closing of the exhaust-gas recirculation valve 138. This guarantees that more oxygen is made available in case of a sudden acceleration of the internal combustion engine. Thus, soot, particularly in case of acceleration, emission can be limited.

Figure 5C:
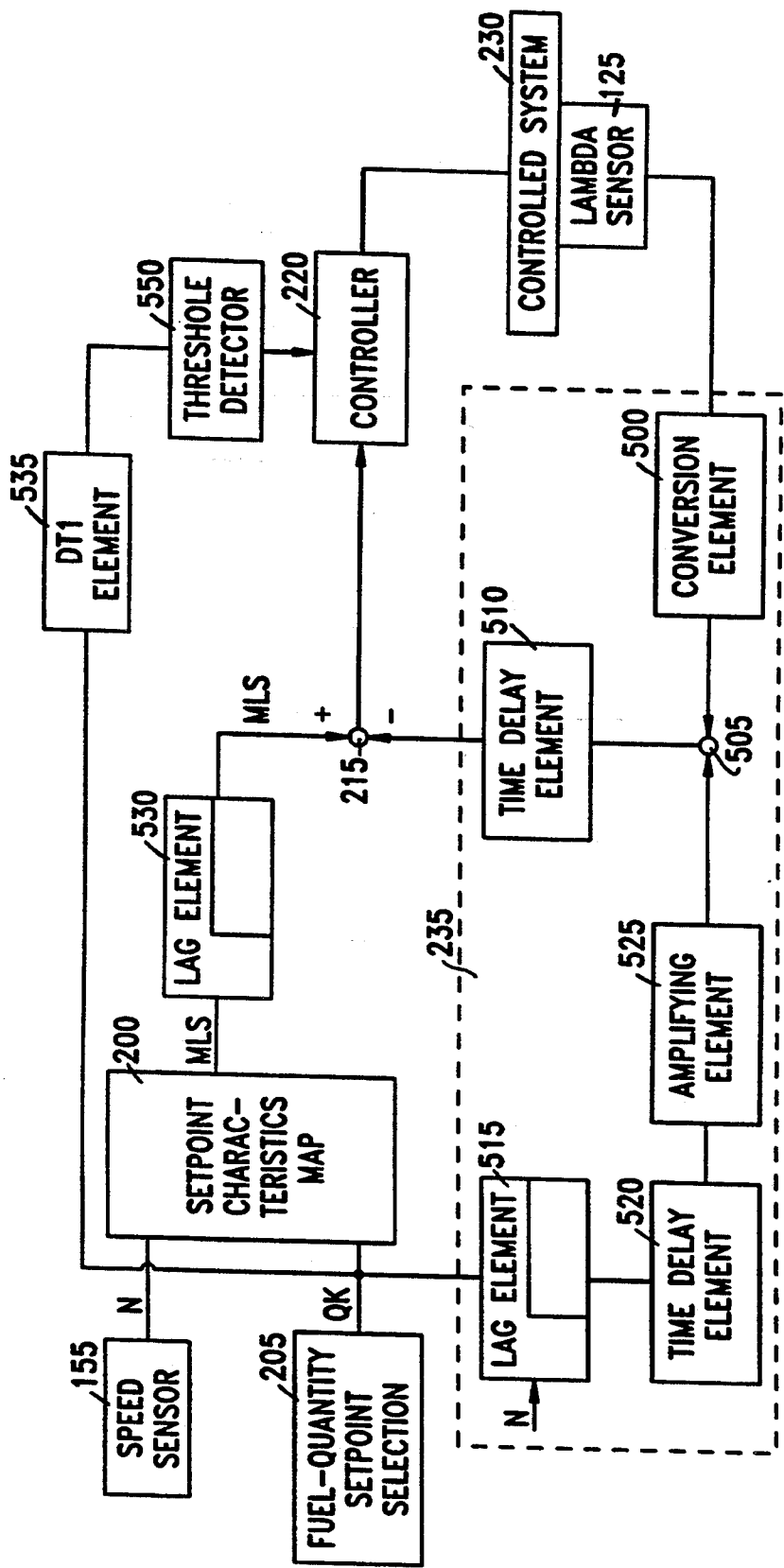

According to FIG. 5c, the amplifier 540 is replaced by a threshold interrogation unit 550. The response characteristic of the controller 220 is influenced based on the result of the threshold interrogation. Thus, the integral-action component of the controller 220 is adjusted to a value which results in a small pulse duty factor when the differentiated signal QK exceeds a threshold. This likewise causes the exhaust-gas recirculation valve 138 to close.

Figure 5D:
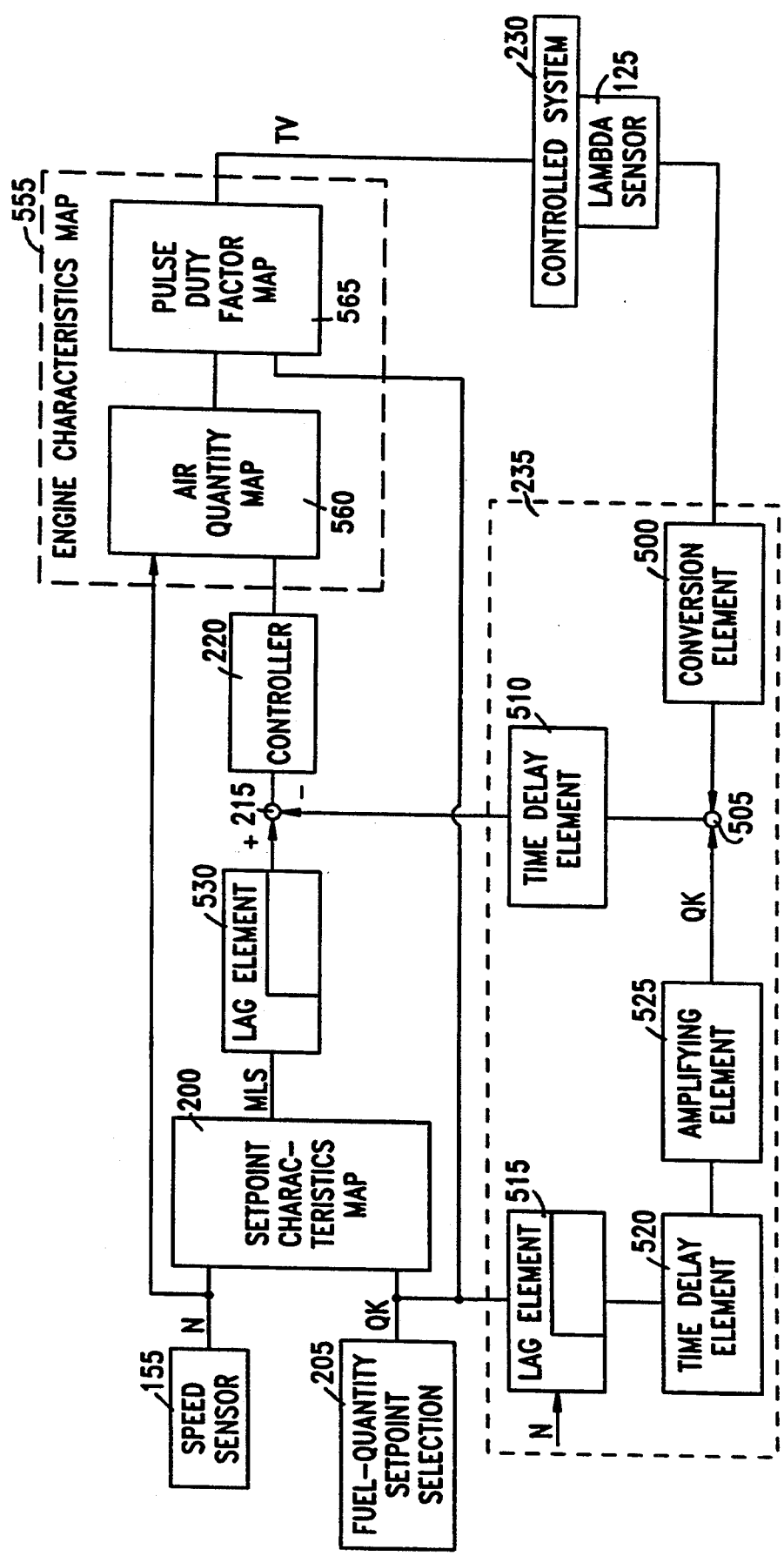

In FIG. 5d, the output signal from the speed sensor 155, the selected fuel injection quantity 205, and the output signal from the controller 220 are fed to an engine characteristics map 555, whose output signal is then conducted to the controlled system 230. The engine characteristics map 555 consists of two characteristics maps 560 and 565. The speed signal and the output signal from the controller 220 are supplied to the characteristics map 560. The output signal from the characteristics map 560 and the fuel quantity QK are supplied to the characteristics map 565.

The engine characteristics map 555 is described as a characteristics map for the exhaust-gas recirculation valve. The pulse duty factor TV is filed in this characteristics map as a function of the rotational frequency N, the selected fuel injection quantity QK, and the controller output signal. The air quantity is filed in the first characteristics map 560 based on the output signal from the controller and upon the rotational frequency QK. Based on the fuel quantity QK and the air quantity MLS, the pulse duty factor TV for triggering the electropneumatic transformer 150 is then filed in the second characteristics map 565. This characteristics map is rated to conform to an ideal open-loop control system. It compensates for the dead time and the delay time. The controller 220 only compensates for small deviations from the setpoint value.

Figure 6:
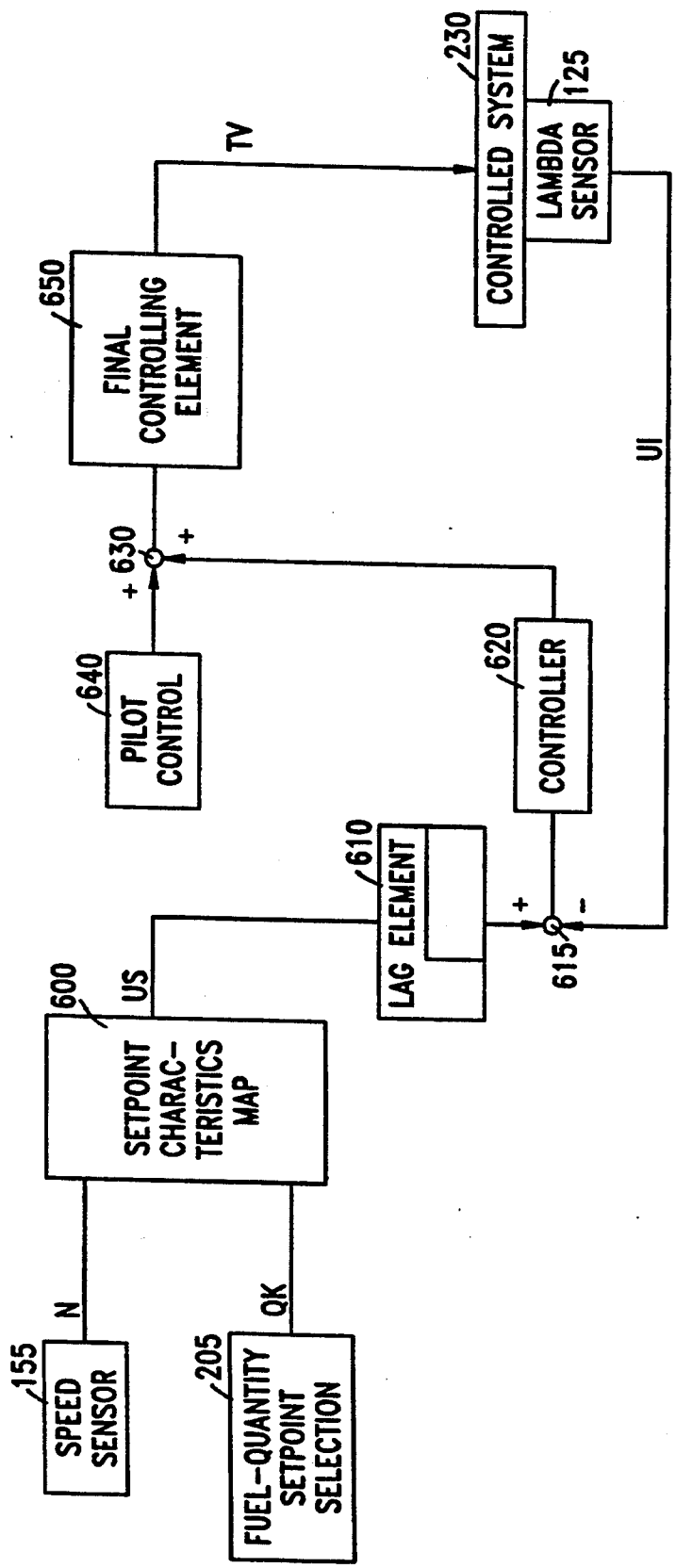
FIG. 6 shows another specific embodiment of the present invention, in which the output signal from the lambda probe is controlled.

Another specific embodiment of the system according to the invention is depicted in FIG. 6. In the previous specific embodiments, the air quantity MLI actually required was calculated based on the output signal from an oxygen sensor arranged in the exhaust pipe. This air quantity was then transmitted as an actual value to a closed-loop control system, which adjusted it to a specified setpoint value. In the specific embodiment shown in FIG. 6, the output signal from the lambda probe 125 is directly processed, rather than the air-quantity signal. This output signal from the lambda probe 125 is proportional to the oxygen concentration in the exhaust gas.

The output signals from the speed sensor 155 and the fuel-quantity setpoint selection 205 are supplied to a setpoint characteristics map 600. The output signal US from the characteristics map 600 connects to, via a lag element 610, a summing point 615, whose output signal is fed to a controller 620. The output signal of the controller 620 connects to, via a node 630, a final controlling element 650. From there, it connects to the controlled system 230. Arranged on the controlled system is the oxygen sensor 125, which conducts a signal UI to the second input of the summing point 615. The output signal from the block 640 is transmitted to the second input of the node 630.

This device functions as follows. In this specific embodiment, the probe voltage is the controlled variable. The setpoint value US for the output voltage of the lambda probe 125 is filed in the setpoint field 600 based on the rotational frequency N and the selected fuel injection quantity QK. This signal is delayed in the lag element 610 based on rotational frequency. The lag element is selected so as to allow the dead time of this lag element 610 to correspond to the dead time of the output signal UI of the lambda probe 125 during a sudden load change. Furthermore, a time-delay element can also be provided for considering the probe dynamic.

The summing point 615 compares this signal to the actual output signal UI from the lambda probe. Based on this comparison, the controller 620 generates a manipulated variable for the actuator contained in the controlled system 230. When necessary, this signal is amplified in the P element 650.

Furthermore, the output signal from the block 640 can also be added to this signal in the node. Block 640 concerns a pilot control. The pulse duty factor TV for triggering the electropneumatic transformer is applied to the output of the P element 650.

Figure 7:
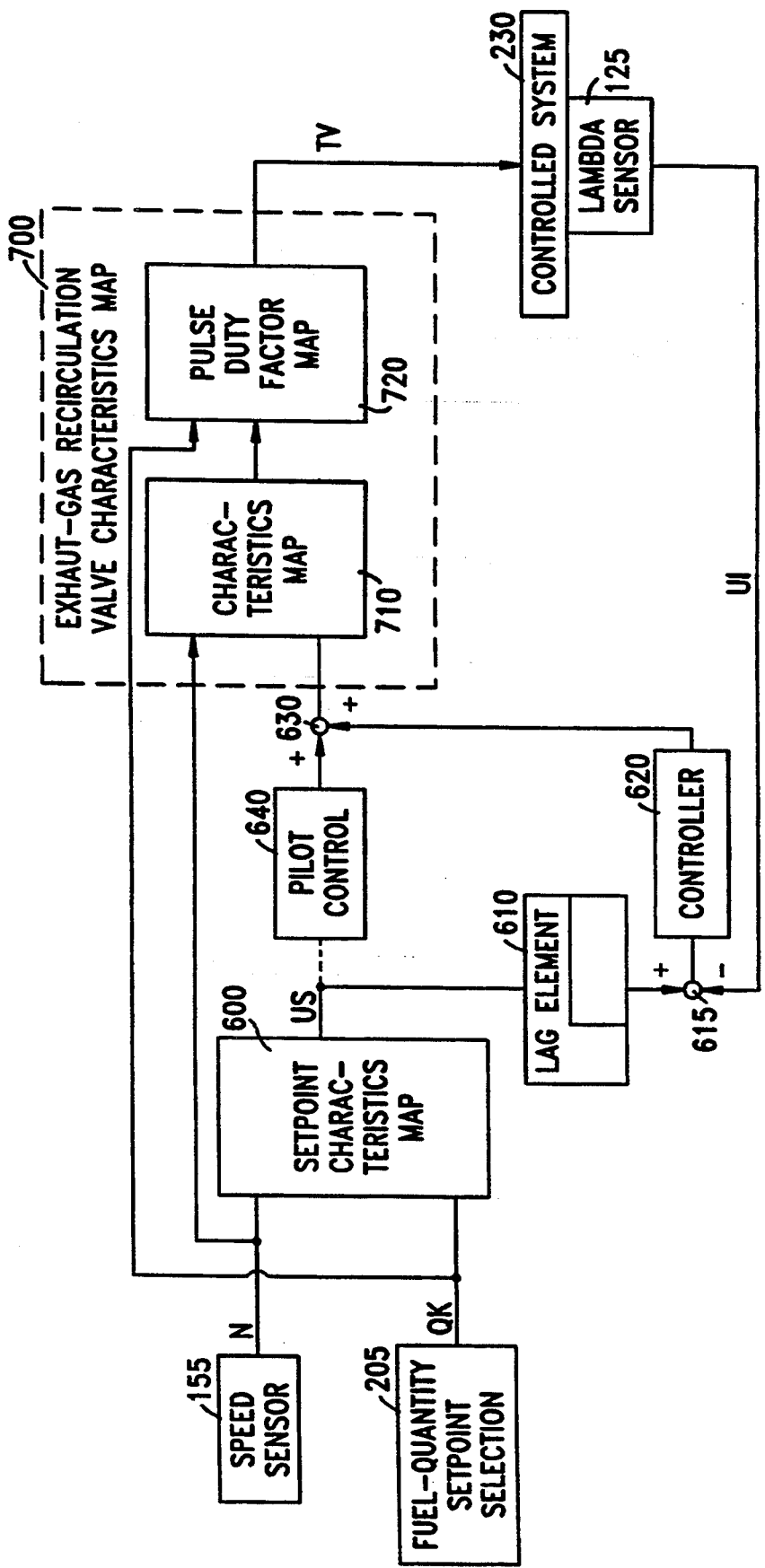
FIGS. 7 and 8 each shows a refinement of the present invention which has a pilot control of the specific embodiment shown in FIG. 6.

Again poor dynamic response of the system results in this specific embodiment. To eliminate these disadvantages, the refinement is provided as shown in FIG. 7. In this refinement, a characteristics map 700 is provided, which is described as an exhaust-gas recirculation-valve characteristics map. In the map, the pulse duty factor TV for the electropneumatic transformer is filed based on rotational frequency, the selected fuel injection quantity, and the manipulated variable specified by the controller 620.

A first variable is filed in a first characteristics map 710 based on the manipulated variable of the controller 620 and rotational frequency. The pulse duty factor TV is stored in a second characteristics map 720 based on this first variable and the selected fuel injection quantity. The controller 620 supplies an actuating-voltage to the three-dimensional characteristics map 700.

In case of sudden changes in quantities, the controller 620 initially does not react because of the dead time in the setpoint branch and the actual branch. However, the selected fuel injection quantity QK immediately effects a corresponding change in the pulse duty factor TV via the characteristics map 720. Thus, without delay, a sudden change in quantity results in a reduced exhaust-gas recirculation rate. After expiration of the dead time, the controller 620 adjusts the output signal UI from the lambda probe to the setpoint voltage US, which had been changed according to the working point.

Figure 8:
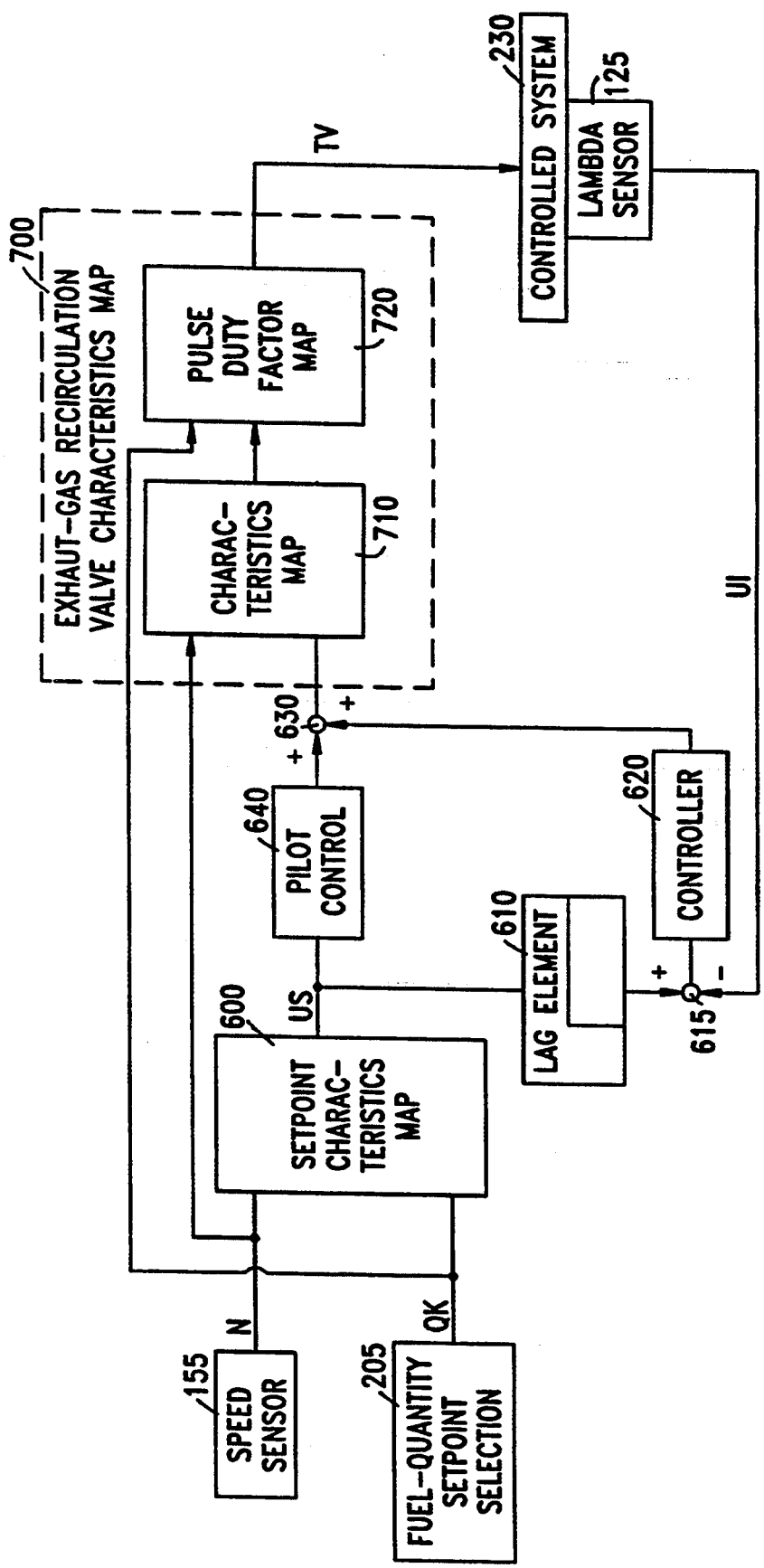

In another variant, shown in to FIG. 8, the output signal from the setpoint characteristics map 600 is additionally applied via the summing point 630 to the output signal from the controller 620. As a result, the pilot control 640 acts based on the output signal from the setpoint characteristics map 600 and parallel to the controller. In this case, the setpoint value US controls the pulse duty factor via the valve characteristics map 700. When the valve characteristics map matches the valve specimen without any errors, the controller 620 does not need to intervene in a steady-state operation. In this case, the controller 620 merely compensates for tolerances among the individual valve specimen.

To increase the accuracy of the pilot control, a current output signal is used as an output signal instead of a valve characteristics map having a pulse duty factor. In addition, a current regulator is provided to compensate for the effects of temperature and battery-voltage corrections.

Figure 9:
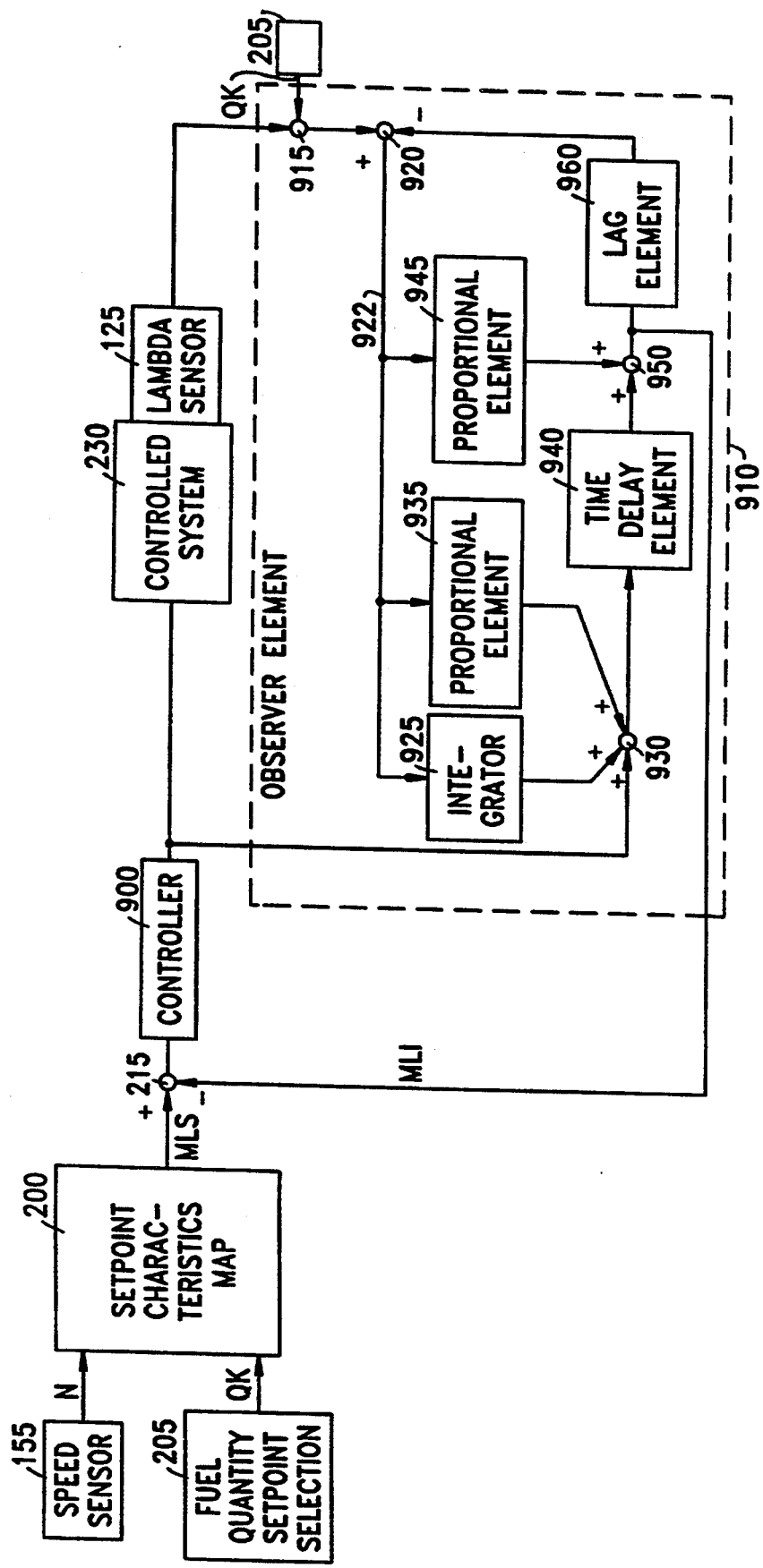
FIG. 9 shows another specific embodiment having a model for simulating the controlled system.

Another specific embodiment of the closed-loop control system of the present invention is shown in FIG. 9. This system employs a model for simulating the controlled system. The model is trimmed based on a signal from the lambda probe 125. The trimming operation is carried out preferably only for working points having a well-defined air quantity. An example of preferred working points is the idling operation or operating conditions in which no recirculation of exhaust gas takes place.

The output signal from the reference point 215 connects to a controller 900. The output signal from the controller 900 is first supplied to the controlled system 230 and a node 930. The output signal from the lambda probe 125 connects to an observer element 910. This observer element includes a node 915, which receives the lambda signal.

The output signal from the node 915 connects to a summing point 920. Its output signal is transmitted via a switch 922 to an integrator 925, a proportional element 935, and a second proportional element 945. The output signal from the integrator 925 and from the proportional element 935 both connect to the node 930. Its output signal connects to a summing point 920 via the time-delay element 940. The output signal from the second proportional element 945 is available at the second input of the summing point 950.

The output signal from the node 950 indicates the actual intake air quantity MLI and is transmitted to the node 215 and the lag element 960. The output signal from the lag element 960 connects to the summing point 920 with a negative operational sign. The output signal from the fuel-quantity setpoint selection 205 is applied to the second input of the node 915.

This device functions as follows. Based on the output signal from the controller 900, the model 910 calculates the required actual air quantity MLI. This model 910 can also be described as a simulation or observer element, since it likewise specifies the air quantity based on the selected fuel injection quantity QK. A time-delay element 940 and a lag element 960 simulate the response-characteristic of the controlled system in a first approximation. The time-delay element 940 corresponds to the controlled system 230 and the lag element 960 reveals the exhaust-gas delay time.

In an ideal model, the output signal from the lag element 960 corresponds to the output signal from the lambda probe 125. For this purpose, a signal having the air-quantity dimension is likewise specified in the node 915, while utilizing the selected fuel injection quantity and the output signal from the lambda probe. If these two signals which are fed to the summing point 920 are the same, this is an ideal model. On the other hand, if they are different, then the model must be trimmed accordingly. This is achieved by generating the injection variables by the integrator 945, and two amplifiers 935 and 945.

Figure 10:
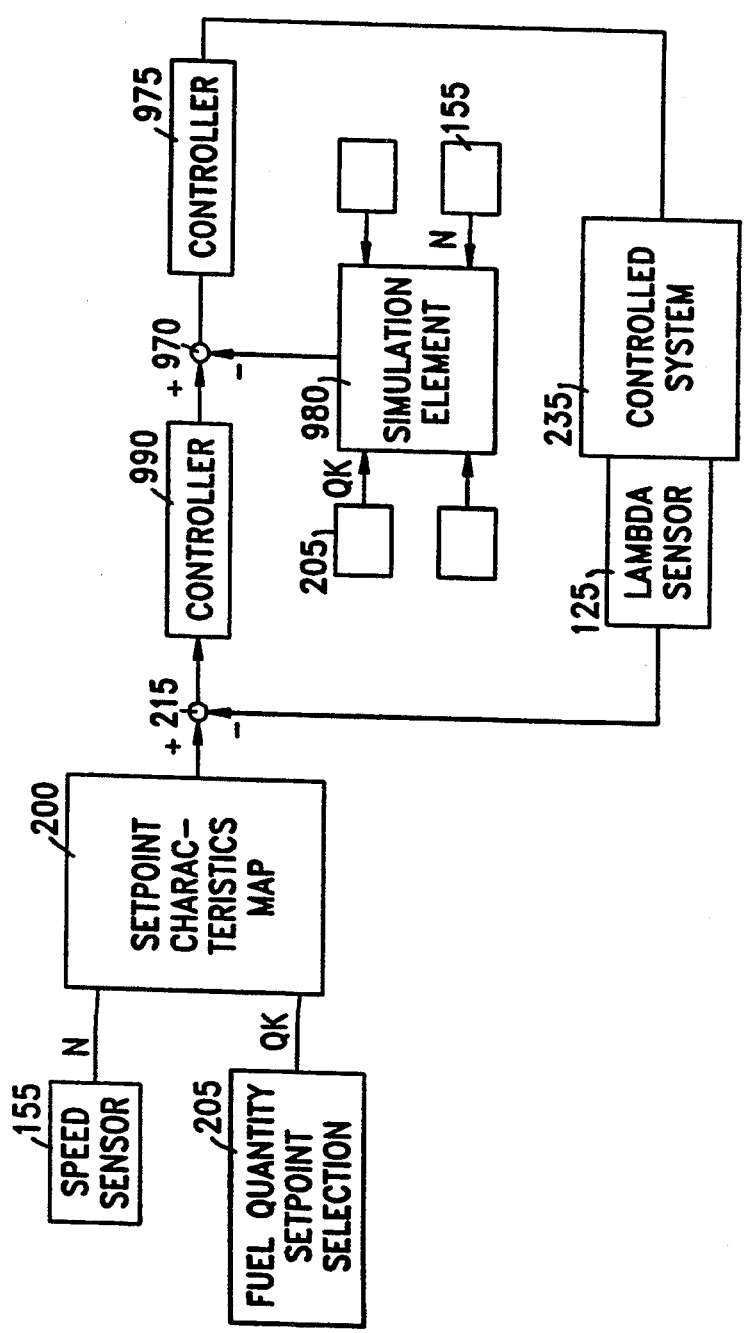
FIG. 10 shows another specific embodiment of the present invention having a cascade regulator.

Another specific embodiment of the system is depicted in FIG. 10. It is a question here of a cascade controller. The output signal from the node 215 connects to a first controller 990 directly and a second controller 975 via a node 970. The controlled system 230 then receives the output signal from the second controller 975. The signal detected by the lambda probe is transmitted directly to the reference point 215. The output signal from a simulation element 980, which is supplied with various sensor signals, is applied to the node 970.

Based on the rotational frequency and the selected fuel injection quantity QK, the air ratio λ is filed in the setpoint characteristics map 200. This ratio is compared in the reference point 215 to the air ratio acquired by the lambda sensor 125. This comparative result is transmitted to the first controller 990. This controller preferably has at least integral performance characteristics. It prepares a setpoint value for the second controller 975. This setpoint value is transmitted to the node 970. The output signal from the simulation element 980 is applied to the second input of the node 970. Based on different variables, such as the selected fuel injection quantity and the rotational frequency, this simulation element calculates an actual value. Such a simulation is described in FIGS. 3 and 4. The output signal from the node 970 is supplied to the controller 975. This second controller preferably has P or PT action control response. It then generates the manipulated variable which is received by the controlled system 230.

Figure 11:
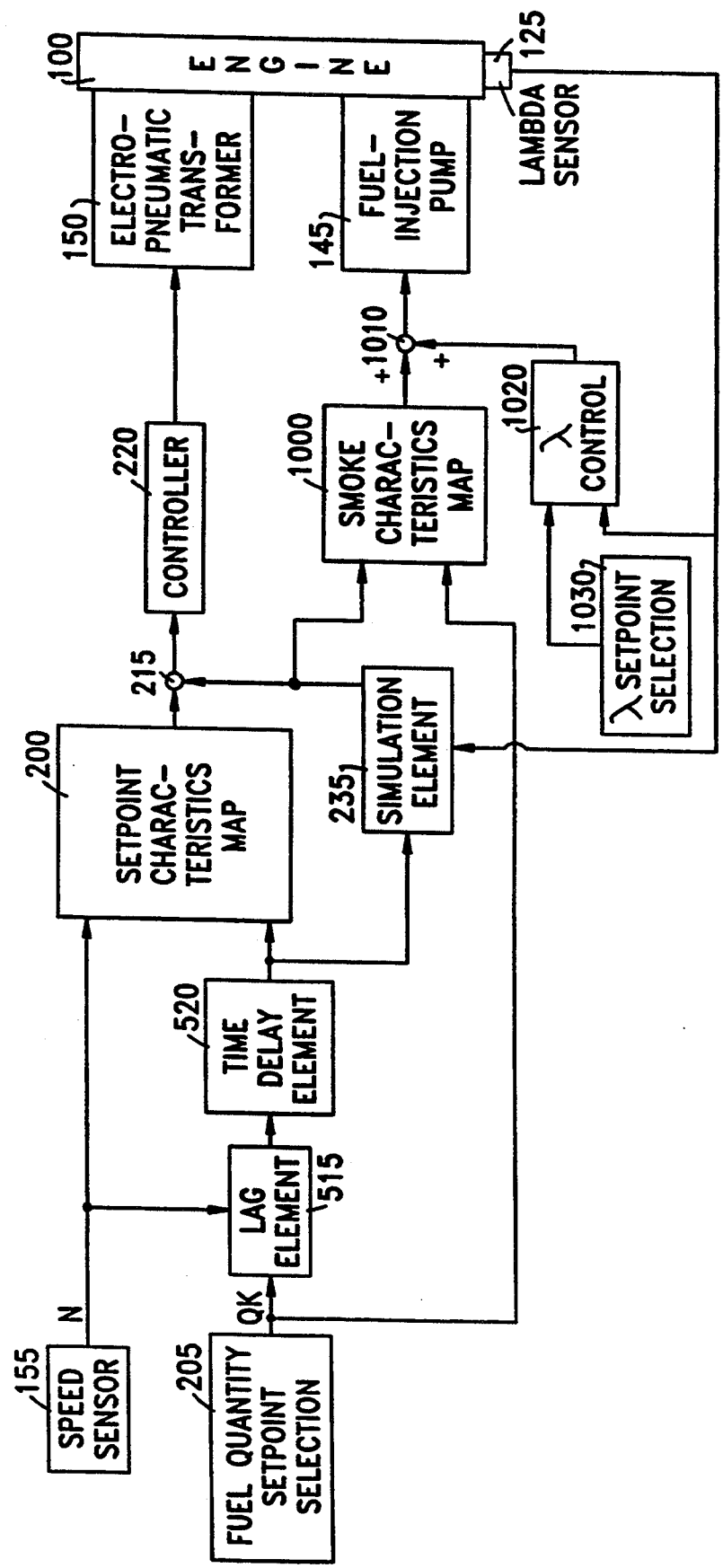
FIG. 11 shows a specific embodiment of the present invention in which the final controlling element is triggered to influence the injected fuel quantity.

FIGS. 11 shows a specific embodiment of the system according to the present invention, in which the final controlling element is triggered to influence the injected fuel quantity.

In contrast to the specific embodiment according to FIG. 5a, the output signal from the fuel-quantity setpoint selection 205 is transmitted, via the lag element 515 and the time-delay element 520, to the setpoint characteristics map and the simulation element 235.

The output signal from the simulation also connects to a smoke characteristics map 1000. The output signal from the fuel-quantity setpoint selection 205 connects to the second input of the smoke characteristics map 1000. The smoke characteristics map transmits a signal to the node 1010 to act upon the injection pump.

The output signal from a lambda control 1020 is applied to the second input of the node. This lambda control prepares a signal based on the comparison between the measured lambda value and the setpoint value transmitted by a setpoint selection 1030.

This device functions as follows. Besides the exhaust-gas recirculation control, described in the previous Figures, a lambda control 1020 is provided. This lambda control determines the selected fuel injection quantity to be injected, particularly in full-load operation. Because of the dead time and the delay time, this lambda control only reacts slowly to changing operational conditions.

For this reason, a pilot control is provided, which essentially consists of a smoke characteristics map. Based on the selected fuel injection quantity QK, which corresponds to the wish of the driver and the air-quantity value calculated for the exhaust-gas recirculation, a permissible selected fuel injection quantity is filed in this smoke characteristics map. This quantity signal is superimposed, preferably cumulatively, on the output signal from the lambda control in the node 1010.

A particularly advantageous application of the above-described system is described in the following procedure. The intake air quantity MLI is calculated in accordance with the above-described simulation. For the most part, no further sensors are needed for this calculation. This calculated air quantity is then used to perform an error control. Thus, for example, systems containing an air-quantity measuring device can have their method of functioning tested by comparing the output signal from the air-quantity measuring device to the calculated air-quantity signal. If the two values deviate from one another by more than one specified value, then one must assume that there is a defect. Errors in the area of fuel metering, a.k.a. mixture formation, can be recognized based on the comparison between the calculated and the measured value.

What is claimed is:

1. A system for controlling an internal combustion engine, comprising:
    a signal generator for generating a first signal representative of a desired intake-air quantity based on at least two operating parameter signals;
    a sensor for generating a second signal representative of an exhaust air concentration;
    a simulation element for generating a third signal representative of an actual intake-air quantity based on at least one of the operating parameter signals used in generating the first signal and on the second signal;
    a combiner for combining the first and third signals and generating a fourth signal based on the difference between the first and third signals; and
    a control element for controlling an air-fuel mixture of the engine in accordance with the fourth signal.

2. The system according to claim 1, wherein the simulation element further includes at least one temporal conditioning element for processing the at least one operating parameter signal used in generating the third signal.

3. The system according to claim 2, further comprising at least one additional temporal conditioning element for processing the first signal.

4. The system according to claim 3, wherein the temporal conditioning elements are selected from the group consisting of at least one lag element and at least one time-delay element.

5. The system according to claim 4, wherein a respective response characteristic of the time-delay element and the lag element is based on engine operating parameters.

6. The system according to claim 1, wherein the second signal is a signal representation of an oxygen concentration in an exhaust gas.

7. The system according to claim 6, wherein the oxygen concentration signal is generated by a lambda probe.

8. The system according to claim 1, wherein the signal generator includes a characteristics map.

9. The system according to claim 1, wherein the simulation element is trimmed by the second signal.

10. The system according to claim 1, wherein the control element controls an exhaust-gas recirculation rate of the engine.

11. The system according to claim 1, wherein the first and the second signals are for error recognition.

12. The system according to claim 1, wherein the at least two operating parameter signals include signals which are based on a selected fuel injection quantity, and a rotational frequency.

13. The system according to claim 12, further comprising a pilot control for producing a signal for triggering the control element on the basis of the selected fuel injection quantity.

14. The system according to claim 13, wherein the pilot control includes a DT1 element and an amplifier having an asymmetrical gain characteristic.

15. The system according to claim 13, wherein a threshold value of a fifth signal output from the DT1 element is exceeded, the pilot control provides a sixth signal to cause the engine to operate with a low exhaust-gas recirculation rate.

16. The system according to claim 15, wherein the pilot control includes an engine characteristics map that specifies a pulse duty factor for triggering a final controlling element on the basis of at least the rotational frequency, and the output signal from the DT1 element.

17. The system according to claim 15, wherein the pilot control further processes the signal representative of the selected fuel injection quantity.

18. The system according to claim 15, wherein the pilot control further processes the first signal.

19. A system for controlling an internal combustion engine, comprising:
    a signal generator for generating a first signal representative of a desired exhaust air concentration based on at least two operating parameter signals;
    a sensor for generating a second signal representative of an actual exhaust air concentration;
    at least one temporal conditioning element for processing the first signal;
    a combiner for combining the first and second signals and generating a third signal based on the difference between the first and second signals; and
    a control element for controlling an air-fuel mixture of the engine in accordance with the third signal.

20. The system according to claim 19, wherein the at least one temporal conditioning element is selected from the group consisting of a lag element and a time-delay element.

21. The system according to claim 20, wherein a respective response characteristic of the time-delay element and the lag element is based on engine operating parameters.

22. The system according to claim 19, wherein the second signal is a signal representative of an oxygen concentration in exhaust gas.

23. The system according to claim 22, wherein the oxygen concentration signal is generated by a lambda probe.

24. The system according to claim 19, wherein the signal generator includes a characteristics map.

25. The system according to claim 19, wherein the at least two operating parameter signals include signals which are based on a selected fuel injection quantity and a rotational frequency.

26. The system according to claim 19, wherein the control element controls an exhaust-gas recirculation rate of the engine.

27. The system according to claim 25, further comprising a pilot control for producing a signal for triggering the control element on the basis of at least the selected fuel injection quantity and the rotational frequency.

28. The system according to claim 27, wherein the pilot control includes an engine characteristics map that specifies a pulse duty factor for triggering the control element.

29. The system according to claim 21, wherein the pilot control further processes the first signal.

30. The system according to claim 19, wherein the first and second signals are for error recognition.

* * * * *

UNITED STATES PATENT AND TRADEMARK OFFICE
CERTIFICATE OF CORRECTION

PATENT NO. : 5,381,775

DATED : January 17, 1995

INVENTOR(S) : BIRK et al.

It is certified that error appears in the above-identified patent and that said Letters Patent is hereby corrected as shown below:

```
Column 1, line 6, after "to" insert --a--;

Column 14, line 14, after "wherein" insert --when--;
    and

Column 16, line 3, "21" should be --27--.
```

Signed and Sealed this

Twenty-third Day of May, 1995

Attest:

BRUCE LEHMAN

*Attesting Officer*   *Commissioner of Patents and Trademarks*